US010203785B2

(12) United States Patent
Wang et al.

(10) Patent No.: US 10,203,785 B2
(45) Date of Patent: Feb. 12, 2019

(54) TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hongjuan Liu, Beijing (CN); Xiaoliang Ding, Beijing (CN); Shengji Yang, Beijing (CN); Yingming Liu, Beijing (CN); Weijie Zhao, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 14/442,791

(22) PCT Filed: Oct. 11, 2014

(86) PCT No.: PCT/CN2014/088362
§ 371 (c)(1),
(2) Date: May 14, 2015

(87) PCT Pub. No.: WO2015/176469
PCT Pub. Date: Nov. 26, 2015

(65) Prior Publication Data
US 2016/0283000 A1  Sep. 29, 2016

(30) Foreign Application Priority Data

May 20, 2014 (CN) .......................... 2014 1 0213735

(51) Int. Cl.
*G06F 3/041* (2006.01)
*G06F 3/044* (2006.01)

(52) U.S. Cl.
CPC ............ *G06F 3/0412* (2013.01); *G06F 3/041* (2013.01); *G06F 3/044* (2013.01); *G06F 2203/04107* (2013.01)

(58) Field of Classification Search
CPC ............... G06F 3/0412; G06F 3/041; G06F 2203/04107

(Continued)

(56) References Cited

U.S. PATENT DOCUMENTS

2002/0051114 A1\*  5/2002  Kwak .................. G02F 1/1309
                                                      349/192
2002/0171086 A1\* 11/2002  Miyajima ......... G02F 1/136213
                                                      257/72

(Continued)

FOREIGN PATENT DOCUMENTS

WO  2014045601 A1  3/2014

OTHER PUBLICATIONS

European search report dated Nov. 27, 2017 for corresponding application EP 14859327.0.

*Primary Examiner* — Srilakshmi K Kumar
*Assistant Examiner* — Chineyere D Wills-Burns
(74) *Attorney, Agent, or Firm* — Nath, Goldberg & Meyer; Joshua B. Goldberg

(57) ABSTRACT

The present invention provides a touch display panel and a display device. The touch display panel includes a substrate, which is provided thereon with a common electrode layer, a thin film transistor, and a data line and a pixel electrode connected with the thin film transistor. The common electrode layer includes a touch driving electrode and a common electrode which are insulated and spaced apart from each (Continued)

other. The array substrate further includes a shielding layer, which shields a spacing region between the touch driving electrode and the common electrode corresponding to position of the data line, thereby greatly reducing noise generated when the source and the data line are being charged, and in turn enabling the touch and the display of the touch display panel to be performed simultaneously.

13 Claims, 3 Drawing Sheets

(58) Field of Classification Search
 USPC .......................................................... 345/173
 See application file for complete search history.

(56) References Cited

U.S. PATENT DOCUMENTS

| | | | |
|---|---|---|---|
| 2005/0189535 A1* | 9/2005 | Hsueh | H01L 51/5284 257/40 |
| 2006/0231838 A1* | 10/2006 | Kim | G02F 1/136213 257/59 |
| 2008/0180407 A1* | 7/2008 | Utsunomiya | G06F 3/0412 345/174 |
| 2009/0050376 A1* | 2/2009 | Jeon | G06F 3/0416 178/18.03 |
| 2009/0122021 A1* | 5/2009 | Liu | G02F 1/13338 345/173 |
| 2010/0140624 A1* | 6/2010 | Ishii | G02F 1/133707 257/59 |
| 2011/0090194 A1 | 4/2011 | Chang et al. | |
| 2011/0122084 A1* | 5/2011 | Jeon | G02F 1/13338 345/173 |
| 2013/0328812 A1* | 12/2013 | Kim | G06F 3/044 345/173 |
| 2014/0062918 A1* | 3/2014 | Chen | G06F 3/0416 345/173 |
| 2014/0062943 A1* | 3/2014 | Choi | G06F 3/0412 345/174 |
| 2014/0071360 A1 | 3/2014 | Chang et al. | |
| 2014/0168539 A1* | 6/2014 | Kim | G06F 3/041 349/12 |
| 2014/0264606 A1* | 9/2014 | Chiang | H01L 27/124 257/350 |

* cited by examiner orthographic projection of conductive shielding layer
orthographic projection of common electrode layer
orthographic projection of spacing region

TOUCH DISPLAY PANEL AND DISPLAY DEVICE

This is a National Phase Application filed under 35 U.S.C. 371 as a national stage of PCT/CN2014/088362 filed on Oct. 11, 2014, an application claiming the benefit to Chinese application No. 201410213735.2 filed on May 20, 2014; the content of each of which is hereby incorporated by reference in its entirety.

FIELD OF THE INVENTION

The present invention relates to the field of display technology, and particularly relates to a touch display panel and a display device.

BACKGROUND OF THE INVENTION

At present, In Cell touch display panels have broad application prospect because no additional manufacturing process of a touch display panel is required and the In Cell touch display panel has characteristics of extremely small influences on aperture ratio and transmittance of display pixels.

Generally, in the In Cell touch display panel, a certain layer of an array substrate (for example, a common electrode layer) is multiplexed as a touch driving electrode, i.e., the common electrode layer is used as a common electrode as well as the touch driving electrode. To realize this multiplexing, the common electrode layer is required to be cut in both of a transverse direction and a longitudinal direction. In this case, the longitudinal cutting is performed along the direction of data lines, and parts of the common electrode layer corresponding to regions of data lines and sources are cut away, so that these regions cannot be shielded by the common electrode layer, which will result in a large noise in the touch display panel when display and touch are simultaneously performed. Therefore, the display and the touch can only be performed in a time-sharing manner on the whole touch display panel, so that the effects of the touch and the display are poor for the touch display panel.

SUMMARY OF THE INVENTION

In view of the above problems in the prior art, the present invention provides a touch display panel and a display device. By providing a shielding layer, the touch display panel is capable of shielding a spacing region, which corresponds to position of a data line, of the common electrode layer, so that the electric signals on a source and the data line can be shielded properly, thereby greatly reducing noise generated when the source and the data line are being charged, which in turn enables the touch and the display of the touch display panel to be performed simultaneously in a normal way.

The present invention provides a touch display panel, which includes an array substrate. The array substrate includes a substrate, which is provided thereon with a common electrode layer, a thin film transistor, and a data line and a pixel electrode connected with the thin film transistor. The common electrode layer includes a touch driving electrode and a common electrode which are insulated and spaced apart from each other. In a display period of one frame, the touch driving electrode is loaded with a common electrode signal and a touch driving signal in a time-sharing manner. The array substrate further includes a shielding layer, and the shielding layer shields a spacing region between the touch driving electrode and the common electrode corresponding to the position of the data line.

Preferably, the shielding layer is located above and/or below the common electrode layer.

Preferably, the shielding layer is loaded with a common electrode signal.

Preferably, the thin film transistor includes a source, a drain, a gate and an active layer, the source and the drain being provided, in the same layer, above the active layer and being located at both ends of the active layer respectively; the gate is provided above the source and the drain; each of the pixel electrode and the common electrode layer is located above the thin film transistor, and the pixel electrode is connected with the drain; and the source and the data line are provided in the same layer and are connected with each other.

Preferably, the shielding layer and the gate are provided in the same layer.

Preferably, the shielding layer and the gate are formed simultaneously by using the same material.

Preferably, the pixel electrode is located above the common electrode layer, and the shielding layer and the pixel electrode are provided in the same layer.

Preferably, the pixel electrode is located below the common electrode layer, and the shielding layer and the pixel electrode are provided in the same layer.

Preferably, the shielding layer and the pixel electrode are formed simultaneously by using the same material.

Preferably, the array substrate further includes a black matrix, the black matrix being located below the active layer and shielding the active layer completely.

The present invention further provides a display device, which includes the above touch display panel.

The beneficial effects of the present invention are as below.

By providing a shielding layer, the touch display panel provided by the present invention is capable of shielding a spacing region, which corresponds to position of a data line, of the common electrode layer, so that the electric signals on a source and the data line can be shielded properly, thereby greatly reducing noise generated when the source and the data line are being charged, which in turn enables the touch and the display of the touch display panel to be performed simultaneously in a normal way.

DETAILED DESCRIPTION OF THE EMBODIMENTS

To make those skilled in the art better understand the technical solutions of the present invention, the touch display panel and display device provided by the present invention will be further described in detail in conjunction with specific embodiments and accompanying drawings.

Unless state otherwise, the technical terms and scientific terms used herein have general meanings which can be understood by those skilled in the art. Terms such as "first", "second", and the like used in this specification and appended claims do not represent any order, number or importance, but are merely used for distinguishing different components. Similarly, terms such as "a" or "an" or the like do not represent a limitation to number, but represent that the number is at least one. Terms such as "connect" or "connected" or the like are not limited to a physical connection or a mechanical connection, but may include an electrical connection, regardless of a direct connection or an indirect connection. Terms such as "above", "below", and the like are merely used for representing a relationship between relative positions, and the relationship between relative positions is changed after absolute positions of described objects are changed.

Embodiment 1

Figure 1:
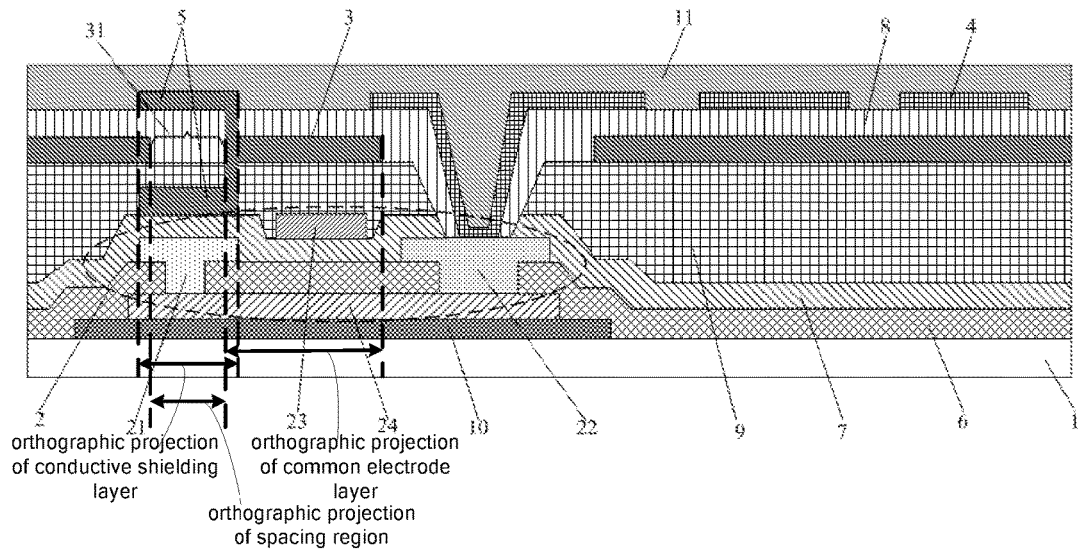
FIG. 1 is a section view of a structure of an array substrate of a touch display panel in embodiment 1 of the present invention.

This embodiment provides a touch display panel, which includes an array substrate. As shown in FIG. 1, the array substrate includes a substrate 1, which is provided thereon with a common electrode layer 3, a thin film transistor 2, and a data line (not shown in FIG. 1) and a pixel electrode 4 connected with the thin film transistor 2. The common electrode layer 3 includes a touch driving electrode and a common electrode which are insulated and spaced apart from each other. In a display period of one frame, the touch driving electrode is loaded with a common electrode signal and a touch driving signal in a time-sharing manner. The array substrate further includes shielding layers 5, and the shielding layers 5 shield a spacing region 31 between the touch driving electrode and the common electrode corresponding to a position of the data line.

In this embodiment, the shielding layers 5 are located above and below the common electrode layer 3. It should be appreciated that, in this embodiment, the shielding layers 5 are connected with the common electrode via through holes, so as to be loaded with the common electrode signal, but the present invention is not limited thereto.

The arrangement of the shielding layers 5 can shield the spacing region 31 between the touch driving electrode and the common electrode corresponding to the position of the data line, so that electric signals on the data line can be shielded properly, thereby greatly reducing noise generated when the data line are being charged, which in turn enables the touch and the display of the touch display panel to be performed simultaneously in a normal way.

The thin film transistor 2 includes a source 21, a drain 22, a gate 23 and an active layer 24. The source 21 and the drain 22 are provided, in the same layer, above the active layer 24 and are located at both ends of the active layer 24, respectively. The gate 23 is provided above the source 21 and the drain 22. Each of the pixel electrode 4 and the common electrode layer 3 is located above the thin film transistor 2, and the pixel electrode 4 is connected with the drain 22. The source 21 and the data line are provided in the same layer and are connected with each other. The shielding layers 5 can also properly shield electric signals on the source 21. A first insulating layer 6 is also provided between the active layer 24 and the source 21 and the drain 22, a gate insulating layer 7 is also provided between the gate 23 and the source 21 and drain 22, and a second insulating layer 8 is also provided between the pixel electrode 4 and the common electrode layer 3. Each of the first insulating layer 6 and the second insulating layer 8 is a passivation layer formed by a resin material.

In this embodiment, the pixel electrode 4 is located above the common electrode layer 3, and a resin layer 9 is provided between the gate 23 and the common electrode layer 3.

In this embodiment, two shielding layers 5 are provided, one of them is provided between the thin film transistor 2 and the common electrode layer 3, and the other is provided above the common electrode layer 3. The arrangement of two shielding layers 5 can better shield the noise generated when the source 21 and the data line are being charged, thereby greatly facilitating the display and the touch of the touch display panel to be performed simultaneously in a normal way.

Among the shielding layers 5, the shielding layer 5 provided between the thin film transistor 2 and the common electrode layer 3 and the gate 23 are provided in the same layer and are formed simultaneously by using the same material, and the shielding layer 5 provided above the common electrode layer 3 and the pixel electrode 4 are provided in the same layer and are formed simultaneously by using the same material. The shielding layers 5 are thus formed, so that no extra manufacturing process and step are required in the manufacturing process of the touch display panel, thus the manufacturing of the touch display panel is simplified, and the manufacturing efficiency is improved. It should be noted that the shielding layers 5 are insulated from the gate 23 and the pixel electrode 4.

In this embodiment, the array substrate further includes a black matrix 10, and the black matrix 10 is located below the active layer 24 and shields the active layer 24 completely. The black matrix thus provided can shield back light from irradiating on the active layer 24, therefore a problem of large leak current caused by the irradiation of the back light on the active layer 24 can be avoided, the normal operations of the thin film transistor 2 and the array substrate can thus be ensured, and the touch display panel can display normally.

In this embodiment, the array substrate further includes a color filter layer 11, and the color filter layer 11 is provided above the pixel electrode 4, which is located at a relatively higher position. The arrangement of the color filter layer can enable the touch display panel to display in colors.

Moreover, the touch display panel further includes a sensing substrate, which is provided opposite to the array substrate. The sensing substrate is provided with a sensing electrode thereon, and the common electrode layer 3 on the array substrate is used as a common electrode in display and is used as a touch driving electrode in touch, i.e., the touch display panel is an In Cell touch display panel. Since the In Cell touch display panel shares the common electrode layer 3 in display and touch, no additional manufacturing process of the touch display panel is required. In touch, a touch driving signal is received by the touch driving electrode, and the sensing electrode senses the touch driving signal and generates a touch sensing signal, so as to complete the touch sensing on the touch display panel.

In the driving method for the above touch display panel, the touch driving and the display driving of the touch display panel are performed simultaneously. At the same time, a part of the touch driving electrodes on the array substrate of the touch display panel are applied with the common electrode signals, while the other part of the touch driving electrodes are applied with the touch driving signals.

Specifically, the touch display panel may include n display regions, where n is an integer larger than 2, and the display regions correspond to a plurality of rows of pixels. The driving method for the touch display panel includes: in the process of progressive scanning, scanning one of n display regions, and outputting a display signal to the display region being scanned while outputting a touch driving signal to one of n−1 display regions not being scanned. By staggering the display driving and the touch driving of the touch display panel at the same time, the method enables the display and the touch of the display panel to be performed simultaneously, thereby improving report rates of the touch display panel. Moreover, the arrangement of the shielding layers in the touch display panel can shield the noise generated in the touch display panel when the touch and the display are performed simultaneously, thereby ensuring that the display and the touch of the touch display panel can be performed simultaneously in a normal way and ensuring the normal effects of the display and the touch of the touch display panel.

Embodiment 2

Figure 2:
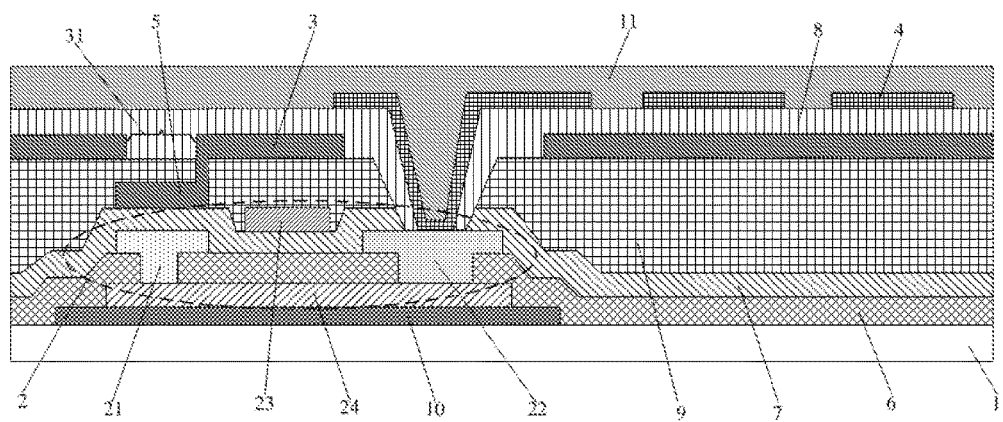
FIG. 2 is a section view of a structure of an array substrate of a touch display panel in embodiment 2 of the present invention.
Figure 3:
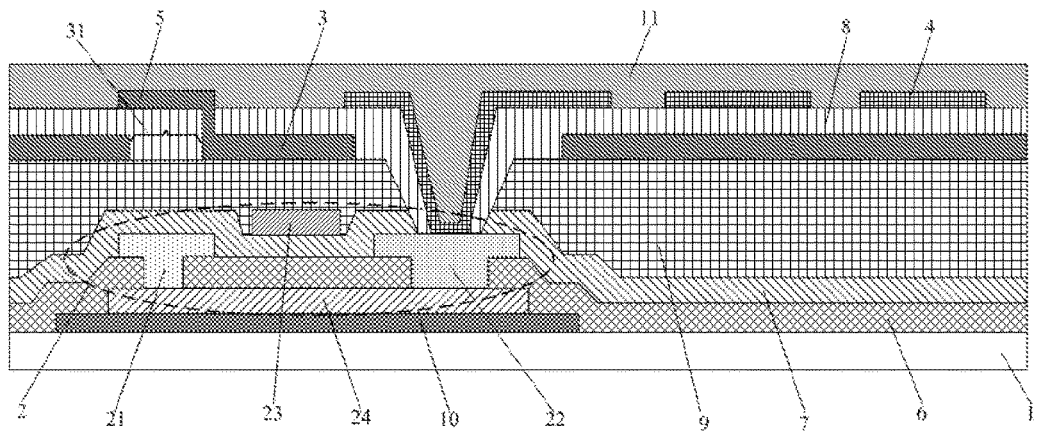
FIG. 3 is a section view of a structure of another array substrate of a touch display panel in embodiment 2 of the present invention.

This embodiment provides a touch display panel, difference from that of embodiment 1 is that only one shielding layer is provided in the touch display panel. As shown in FIG. 2, the shielding layer 5 is located below the common electrode layer 3 and the shielding layer 5 is provided between the thin film transistor 2 and the common electrode layer 3, and the shielding layer 5 and the gate 23 are provided in the same layer and are formed simultaneously by using the same material. Alternatively, as shown in FIG. 3, the shielding layer 5 is located above the common electrode layer 3, and the shielding layer 5 and the pixel electrode 4 are provided in the same layer and are formed simultaneously by using the same material.

Other structures of the touch display panel in this embodiment are the same as those of the embodiment 1 and will not be repeated herein.

Although only one shielding layer 5 is provided in this embodiment, it is also possible to shield the noise generated when the source 21 and the data line are being charged, but the effect of the shielding is slightly lower than that of the arrangement of two shielding layers 5 in embodiment 1.

Embodiment 3

Figure 4:
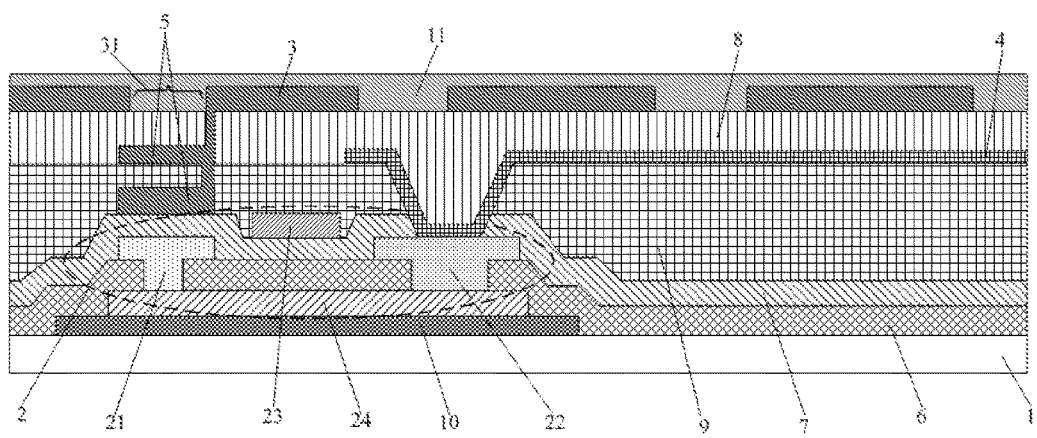
FIG. 4 is a section view of a structure of an array substrate of a touch display panel in embodiment 3 of the present invention.

This embodiment provides a touch display panel, differences from those of embodiments 1 and 2 are that the pixel electrode 4 is located below the common electrode layer 3 and the resin layer 9 is provided between the gate 23 and the pixel electrode 4, as shown in FIG. 4.

In this embodiment, two shielding layers 5 are provided, both of which are located below the common electrode layer 3 and both of which are provided between the thin film transistor 2 and the common electrode layer 3. One of the shielding layers 5 and the gate 23 are provided in the same layer and are formed simultaneously by using the same material. The other one of the shielding layers 5 and the pixel electrode 4 are provided in the same layer and are formed simultaneously by using the same material.

The effect of shielding to the noise generated when the source 21 and the data line are being charged in this embodiment is the same as that of the embodiment 1.

Other structures of the touch display panel in this embodiment are the same as those of the embodiment 1 and will not be repeated herein.

Embodiment 4

Figure 5:
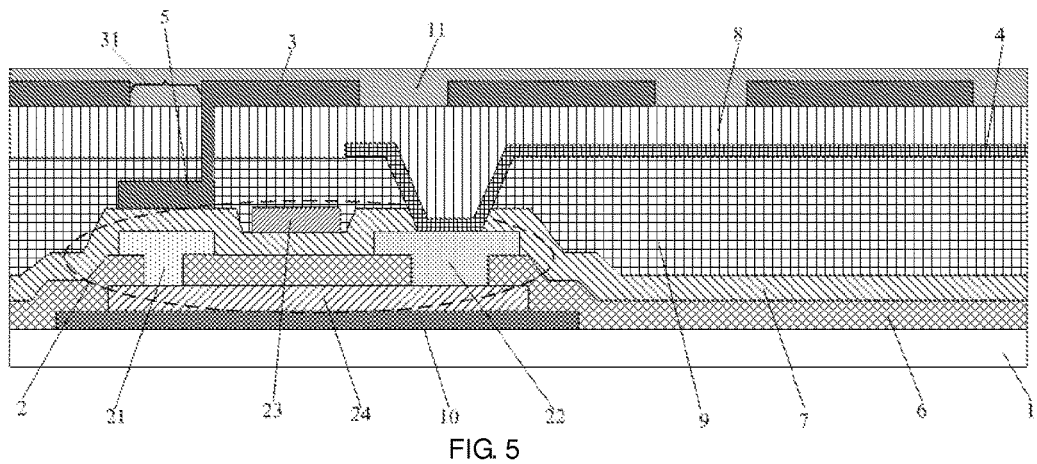
FIG. 5 is a section view of a structure of an array substrate of a touch display panel in embodiment 4 of the present invention.
Figure 6:
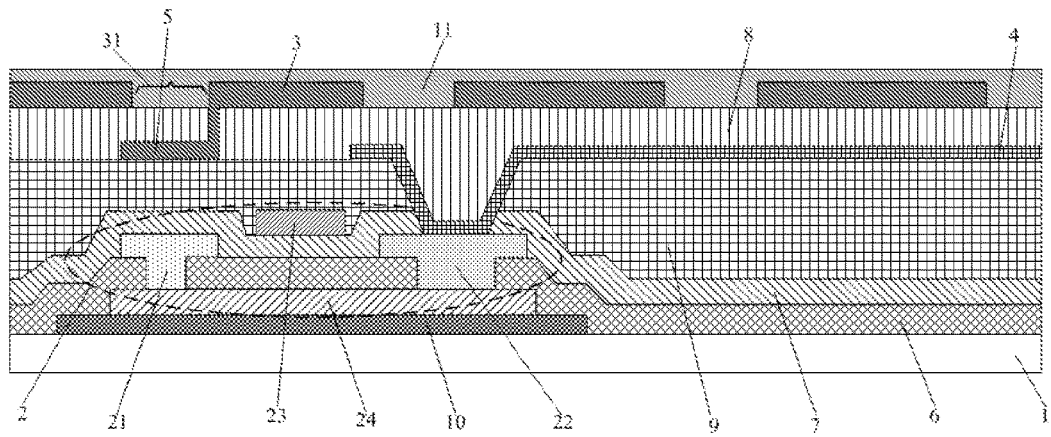
FIG. 6 is a section view of a structure of another array substrate of a touch display panel in embodiment 4 of the present invention.

This embodiment provides a touch display panel, difference from those of embodiments 1 to 3 is that only one shielding layer, which is located below the common electrode layer, is provided in the touch display panel on basis of embodiment 3. As shown in FIG. 5, the shielding layer 5 is provided between the thin film transistor 2 and the common electrode layer 3, and the shielding layer 5 and the gate 23 are provided in the same layer and are formed simultaneously by using the same material. Alternatively, as shown in FIG. 6, the shielding layer 5 and the pixel electrode 4 are provided in the same layer and are formed simultaneously by using the same material.

Other structures of the touch display panel in this embodiment are the same as those of embodiment 3 and will not be repeated herein.

Although only one shielding layer 5 is provided in this embodiment, it is also possible to shield the noise generated when the source 21 and the data line are being charged, but the effect of the shielding is slightly lower than that of the arrangement of two shielding layers 5 in embodiment 3.

Embodiment 5

Figure 7:
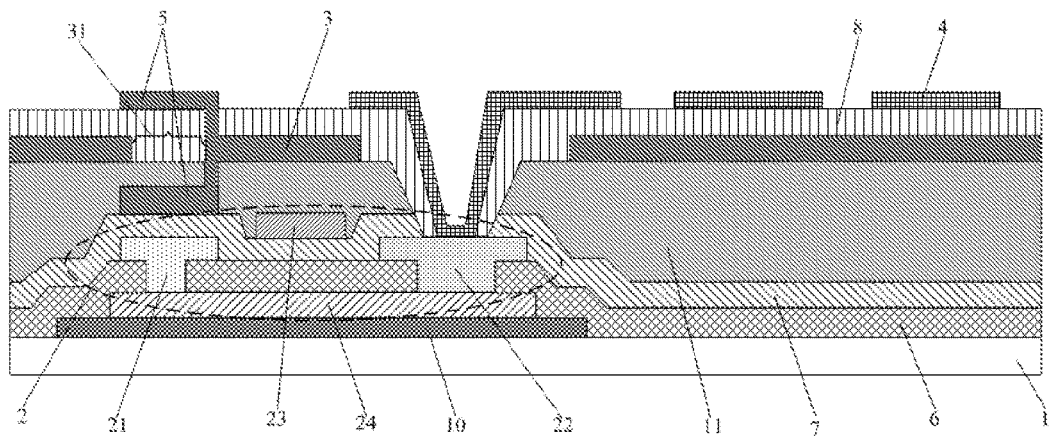
FIG. 7 is a section view of a structure of an array substrate of a touch display panel in embodiment 5 of the present invention.

This embodiment provides a touch display panel, difference from those of embodiments 1 to 4 is that, no resin layer is included in the array substrate, the pixel electrode 4 is located above the common electrode layer 3 and the color filter layer 11 is provided between the gate 23 and the common electrode layer 3, as shown in FIG. 7; alternatively, the pixel electrode is located below the common electrode layer, and the color filter layer is provided between the gate and the pixel electrode.

In this embodiment, as shown in FIG. 7, two shielding layers 5 are provided, one of which is located above the common electrode layer 3, and this shielding layer 5 and the pixel electrode 4 are provided in the same layer and are formed simultaneously by using the same material; the other is provided below the common electrode layer 3, and this shielding layer 5 and the gate 23 are provided in the same layer and are formed simultaneously by using the same material.

Other structures of the touch display panel in this embodiment are the same as those of any one of embodiments 1-4 and will not be repeated herein.

The color filter layer 11 is made of resin materials of red (R), green (G) and blue (B). The resin materials of red (R), green (G) and blue (B) can enable the touch display panel to display in colors and have function of insulation, which can allow the common electrode layer 3 which is located at a relatively lower position or the pixel electrode 4 to be insulated from the gate 23. As such, the thickness of the touch display panel is thinner, and the manufacturing cost of the touch display panel is saved.

Embodiment 6

This embodiment provides a display device, which includes the touch display panel in any one of embodiments 1 to 5.

By adopting the touch display panel in any one of embodiments 1 to 5, not only the noise generated in the display device when the display and the touch are performed is reduced, but also the effects of the display and the touch of the display device are improved.

The beneficial effects of the present invention are as below.

By providing a shielding layer, the touch display panel provided by the present invention is capable of shielding a spacing region, which corresponds to the position of a data line, of the common electrode layer, so that the electric signals on a source and the data line can be shielded properly, thereby greatly reducing noise generated when the source and the data line are being charged, which in turn enables the touch and the display of the touch display panel to be performed simultaneously in a normal way.

It should be noted that the phrase "located above and/or below the common electrode layer" means "located in a layer different from the common electrode layer", which may be formed by using two processes and is not used to limit the positional relationship thereof.

It can be understood that the foregoing implementations are merely the exemplary implementations used for explaining the principle of the present invention, but the present invention is not limited thereto. Various modifications and improvements can be made by those skilled in the art without departing from the spirit and essence of the present invention, and these modifications and improvements should also be construed as falling within the protection scope of the present invention.

What is claimed is:

1. A touch display panel, including an array substrate, wherein the array substrate includes a substrate, and a common electrode layer, a resin layer, a thin film transistor, and a data line and a pixel electrode connected with the thin film transistor provided on the substrate, the common electrode layer including a touch driving electrode and a common electrode which are arranged at a same side of the resin layer and in direct contact with the resin layer and which are insulated and spaced apart from each other by a spacing region corresponding to a position of the data line, and in a display period of one frame, the touch driving electrode being configured to be loaded with a common electrode signal and a touch driving signal in a time-sharing manner, wherein
    the array substrate further includes a conductive shielding layer arranged at a side of the resin layer facing away from the common electrode layer and in direct contact with the resin layer, and the conductive shielding layer is electrically conductive and configured to shield the spacing region between the touch driving electrode and the common electrode corresponding to position of the data line,
    wherein the conductive shielding layer is loaded with a common electrode signal so as to shield electric signals on the data line, and
    wherein an orthographic projection of the conductive shielding layer on the substrate completely covers an orthographic projection of the spacing region on the substrate.

2. The touch display panel according to claim 1, wherein the conductive shielding layer is located above and/or below the common electrode layer.

3. The touch display panel according to claim 1, wherein the thin film transistor includes a source, a drain, a gate and an active layer, the source and the drain being provided, in the same layer, above the active layer and being located at both ends of the active layer respectively; the gate is provided above the source and the drain; each of the pixel electrode and the common electrode layer is located above the thin film transistor, and the pixel electrode is connected with the drain; the source and the data line are provided in the same layer and are connected with each other.

4. The touch display panel according to claim 3, wherein the conductive shielding layer and the gate are provided in the same layer.

5. The touch display panel according to claim 4, wherein the conductive shielding layer and the gate are formed simultaneously by using the same material.

6. The touch display panel according to claim 3, wherein the pixel electrode is located above the common electrode layer, and the conductive shielding layer and the pixel electrode are provided in the same layer.

7. The touch display panel according to claim 6, wherein the conductive shielding layer and the pixel electrode are formed simultaneously by using the same material.

8. The touch display panel according to claim 3, wherein the pixel electrode is located below the common electrode layer, and the conductive shielding layer and the pixel electrode are provided in the same layer.

9. The touch display panel according to claim 8, wherein the conductive shielding layer and the pixel electrode are formed simultaneously by using the same material.

10. The touch display panel according to claim 3, wherein the array substrate further includes a black matrix, the black matrix being located below the active layer and the black matrix shielding the active layer completely.

11. A display device, including the touch display panel according to claim 1.

12. The touch display panel according to claim 1, wherein the conductive shielding layer and the common electrode layer are spaced apart from each other, and are electrically connected with each other via a through hole.

13. The touch display panel according to claim 1, wherein an orthographic projection of the conductive shielding layer on the substrate partially overlaps with an orthographic projection of the common electrode layer on the substrate.

* * * * *